(12) United States Patent
Chuang (10) Patent No.: US 8,029,397 B2
(45) Date of Patent: Oct. 4, 2011

(54) CHAINGUARD AND BICYCLE FRAME

(76) Inventor: Louis Chuang, Taichung (TW)

( * ) Notice: Subject to any disclaimer, the term of this patent is extended or adjusted under 35 U.S.C. 154(b) by 394 days.

(21) Appl. No.: 12/343,681

(22) Filed: Dec. 24, 2008

(65) Prior Publication Data

US 2009/0197725 A1 Aug. 6, 2009

(30) Foreign Application Priority Data

Feb. 5, 2008 (TW) .............................. 97104746 A (51) Int. Cl.
*F16H 55/36* (2006.01)
(52) U.S. Cl. ......................................... 474/144; 82/146
(58) Field of Classification Search ............. 474/78–80, 474/82, 141, 144, 146; 280/281.1, 304.3, 280/288.4, 152.1–152.3; 74/608, 609, 606 R; D12/114, 127, 402
See application file for complete search history.

(56) References Cited

U.S. PATENT DOCUMENTS

| | | | | | |
|---|---|---|---|---|---|
| 2,492,879 | A | * | 12/1949 | Mueller | 474/146 |
| D215,682 | S | * | 10/1969 | Wolf | D12/127 |
| 3,942,646 | A | * | 3/1976 | Nelson et al. | 211/5 |
| 4,054,063 | A | * | 10/1977 | Perrin | 474/147 |
| RE30,547 | E | * | 3/1981 | Belden | 280/240 |
| 7,066,857 | B1 | * | 6/2006 | DeRosa | 474/144 |
| 2010/0194182 | A1 | * | 8/2010 | Katz | 301/109 |

* cited by examiner

*Primary Examiner* — William A Rivera
(74) *Attorney, Agent, or Firm* — Alan Kamrath; Kamrath & Associates PA (57) ABSTRACT

A chainguard for use on a bicycle includes a housing having a connecting portion and an engaging portion. The connecting portion and the engaging portion are connected to a seat tube and a rear stay of a bicycle frame in the bicycle. Additionally, the rear stay includes a first portion and a second portion adapted for engaging with an axle of a rear wheel, and the first and second portions are interconnected at a corner. Additionally, the second portion includes a first surface, a second surface and a third surface substantially transverse to and interconnecting the first and second surfaces. Further, the third surface defines a positioning portion on which the engaging portion of the chainguard is mounted.

17 Claims, 9 Drawing Sheets

CHAINGUARD AND BICYCLE FRAME

BACKGROUND OF THE INVENTION

1. Field of the Invention

The present invention relates to chainguards for use on bicycles and bicycle frames on which the chainguards are mounted.

2. Description of the Related Art

It is appreciated that chainguards are utilized to enclose chains in bicycles in order to prevent foreign material from contacting the chains as well as avoid the rider's trouser legs from being entangled or dirtied by the chains. Generally, these chainguards are attached at a front end thereof to a crank axle of the bicycle and at a rear end thereof to a bracket mounted to a rear stay in a frame of the bicycle. However, a disadvantage of such a structure is that these chainguards tend to have an adverse effect on flowing of the rider's pedaling action. Another disadvantage is that the procedure to install the chainguards on the bicycles is complicated.

The present invention is, therefore, intended to obviate or at least alleviate the problems encountered in the prior art.

SUMMARY OF THE INVENTION

According to the present invention, a bicycle frame includes a seat tube and a rear stay. In particular, the rear stay includes a first portion and a second portion interconnected at a corner defining an obtuse angle and extended obliquely to each other. The second portion is adapted for engaging with an axle of a rear wheel and includes a first surface proximal to the rear wheel, a second surface opposed to the first surface and a third surface substantially transverse to and interconnecting the first and second surfaces. Further, the third surface defines a positioning portion.

In a preferred embodiment, the positioning portion includes a retaining portion and a space delimited within the retaining portion.

A chainguard includes a housing which extends axially and includes a connecting portion connected to the seat tube and an engaging portion connected to the second portion of the rear stay.

In a preferred embodiment, the engaging portion is mounted on the positioning portion and is received in the space of the retaining portion.

In another preferred embodiment, the engaging portion is mounted on the positioning portion.

DETAILED DESCRIPTION OF THE PREFERRED EMBODIMENT

Referring to FIGS. 1 through 4, a chainguard 10 includes a housing comprised of a first body 11 defining a rear section 13 and a second body 12 defining a front section 14. The housing has a connecting portion 16 and an engaging portion 15 connected to a seat tube 30 and a rear stay 20 of a bicycle frame in a bicycle, respectively. In this embodiment, the connecting portion 16 is formed on the second body 12 and the engaging portion 15 is formed on the first body 11.

The housing extends in a length direction between the engaging and connecting portions 15 and 16, and the connecting portion 16 extends substantially transversely to the length direction of the housing. The connecting portion 16 has a proximal end substantially flush with an outer surface of the housing and has a distal end connected to the seat tube 30 by a connecting device 31. In this embodiment, the connecting device 31 has a hole 311, the connecting portion 16 has a hole 161, and a fastener 162 is inserted through the hole 311 and engaged in the hole 161.

The engaging portion 15 also extends substantially transversely to the housing. The engaging portion 15 has a proximal end connected to the outer surface of the housing.

The rear stay 20 includes a first portion 21 and a second portion 22, and the first and second portions 21 and 22 are interconnected obliquely at a corner, which substantially defines an obtuse angle. Additionally, the second portion 22 includes an end connected to a chain stay 23 of the bicycle frame and includes a hook 224 adapted for engaging with an axle of a rear wheel (not shown). Further, the second portion 22 includes a first surface 221 proximal to the rear wheel, a second surface 222 opposed to the first surface 221 and a third surface 223 substantially transverse to and interconnecting the first and second surfaces 221 and 222.

The third surface 223 defines a positioning portion 24 on which the engaging portion 15 of the chainguard 10 is mounted. Preferably, the positioning portion 24 is substantially planar, and the engaging portion 15 includes a planar side lying on the positioning portion 24. Therefore, the attachment of the engaging portion 15 on the positioning portion 24 is easy and stable. Additionally, the positioning portion 24 has a ridge 240 in proximity to the second surface 222, and the engaging portion 15 is mounted within the ridge 240. Therefore, the engaging portion 15 would not have an adverse effect on flowing of rider's pedaling action.

The positioning portion 24 includes a retaining portion 241 and a space 242 delimited within the retaining portion 241 such that the engaging portion 15 is received in the space 242 of the retaining portion 241. The engaging portion 15 is then secured within the space 242 by a fastener 152 which is inserted through a hole 151 defined in the engaging portion 15 and engaged in a hole 244 defined the positioning portion 24. However, it is understood other manners for securing the engaging portion 15 in the space 242 is within the scope of the instant invention.

Figure 1:
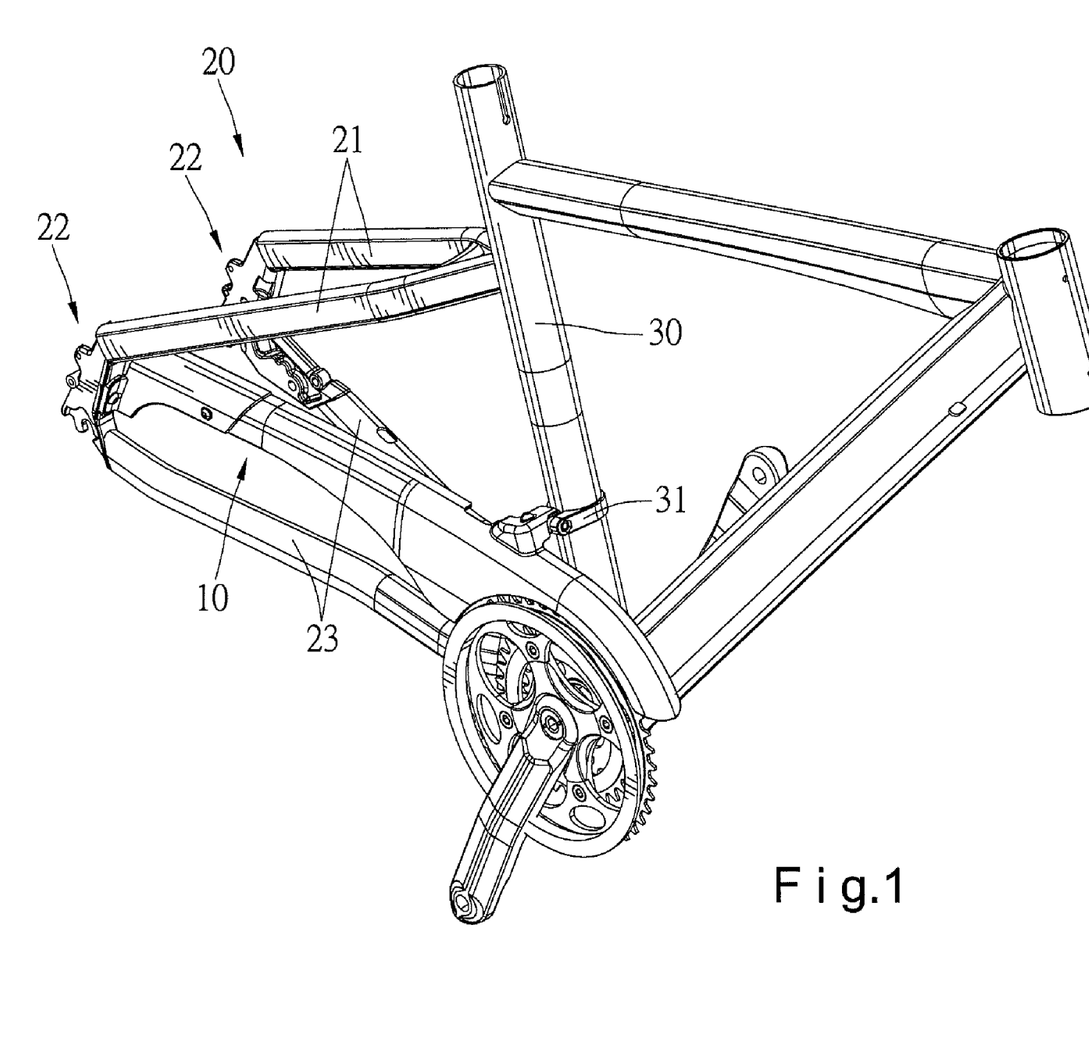
FIG. 1 is a perspective view of a chainguard and a bicycle frame in accordance with a first embodiment of the present invention.
Figure 2:
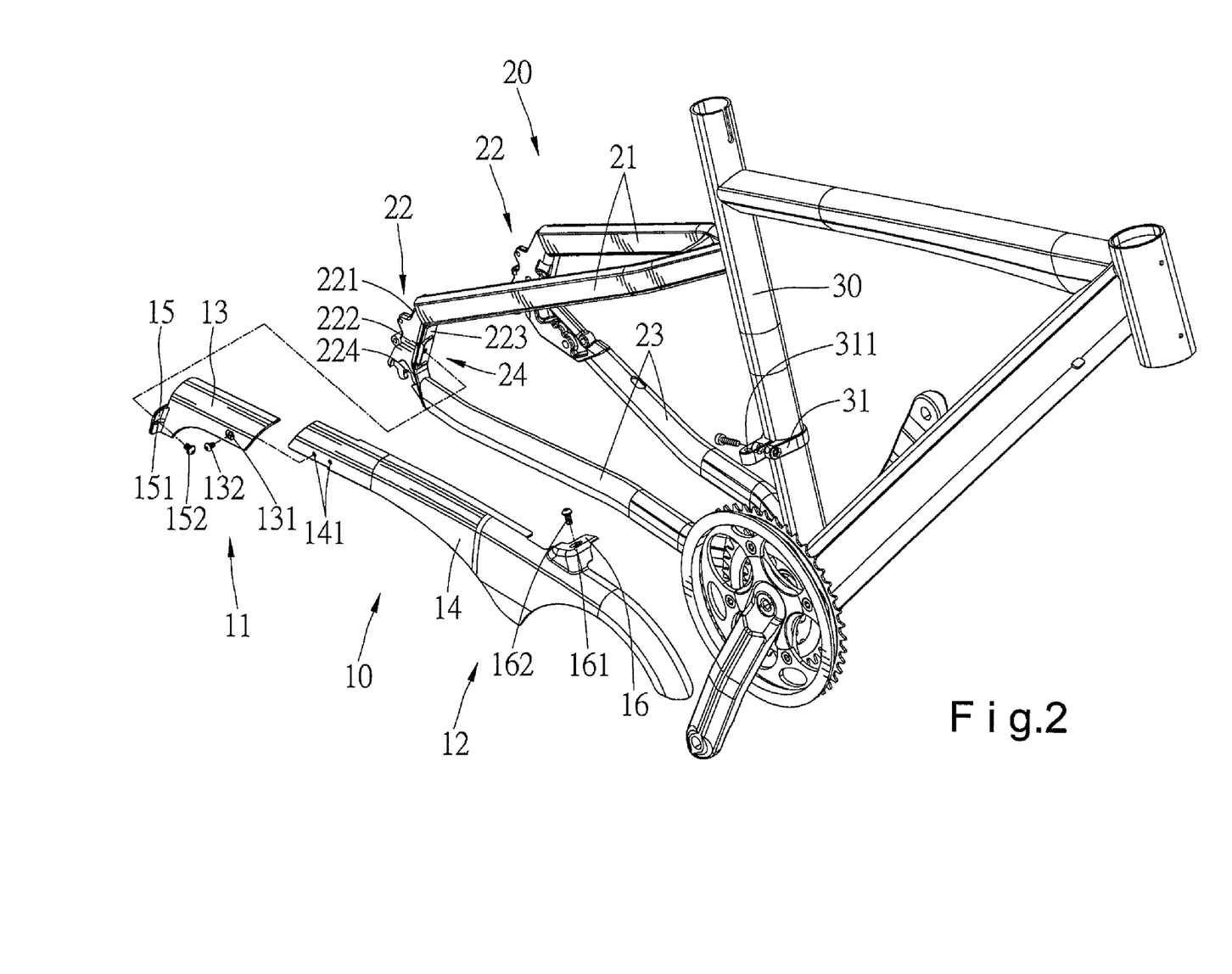
FIG. 2 is an exploded perspective view of the chainguard and the bicycle frame in FIG. 1.
Figure 3:
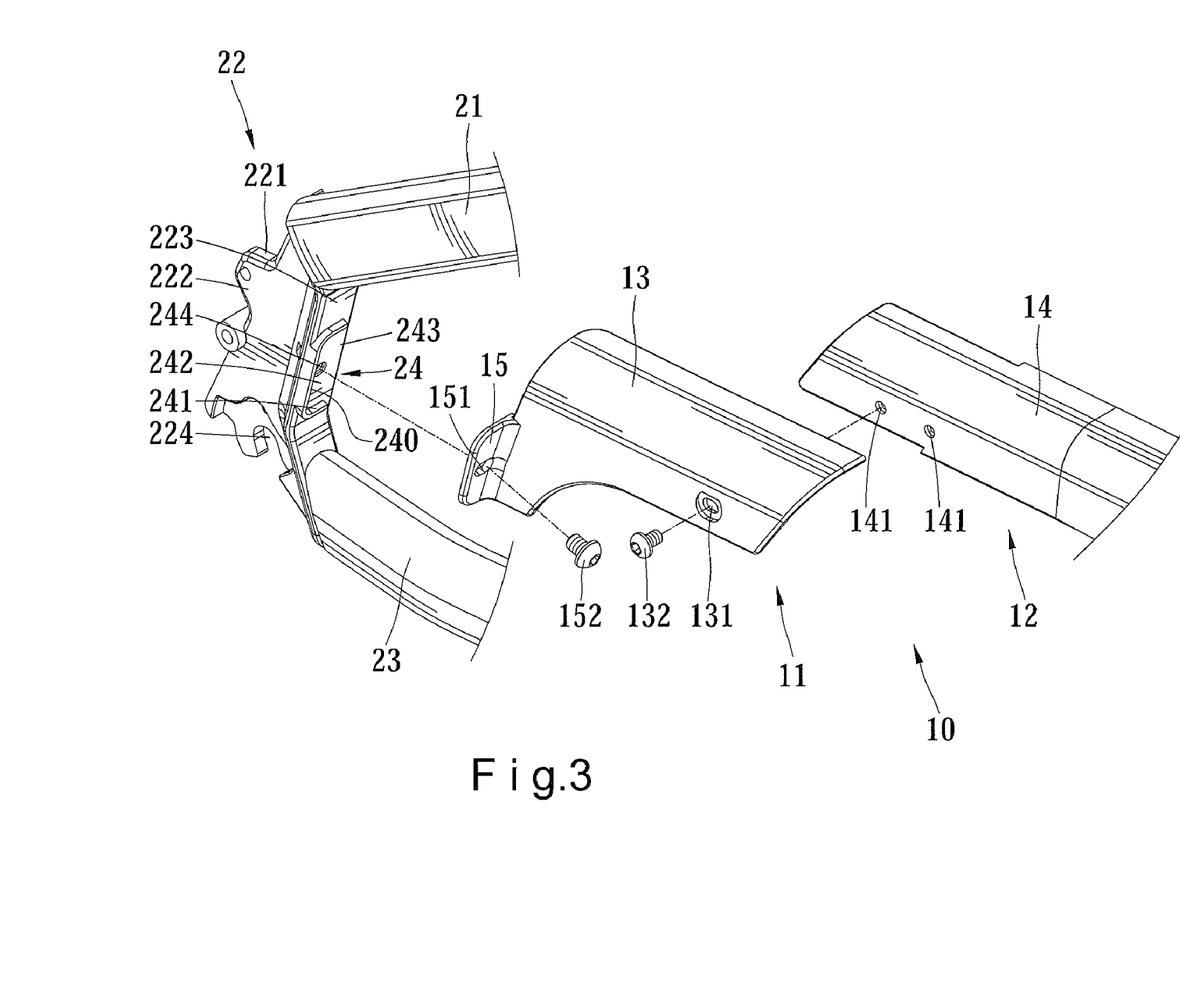
FIG. 3 is a partial, exploded perspective view of the chainguard and the bicycle frame in FIG. 1.
Figure 4:
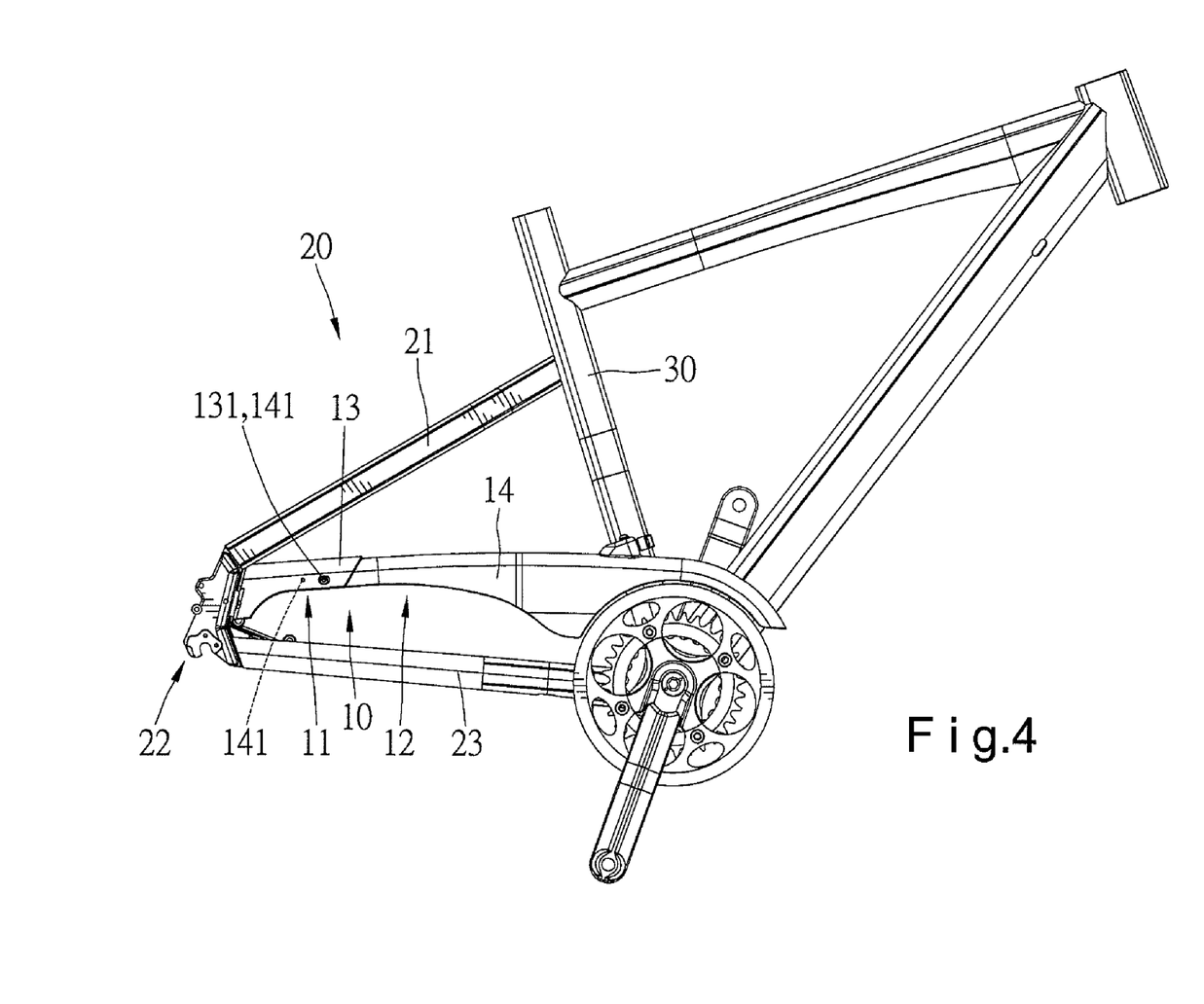
FIG. 4 is a side view of the chainguard and the bicycle frame in FIG. 1.

As best shown in FIG. 3, the retaining portion 241 in the form of the ridge 240 includes a proximal end, a distal end and an opening 243 spacing the proximal and distal ends. Further, the opening 243 opens in a direction in order that the engaging portion 15 is inserted outwardly with respect to the first surface 221.

Figure 5:
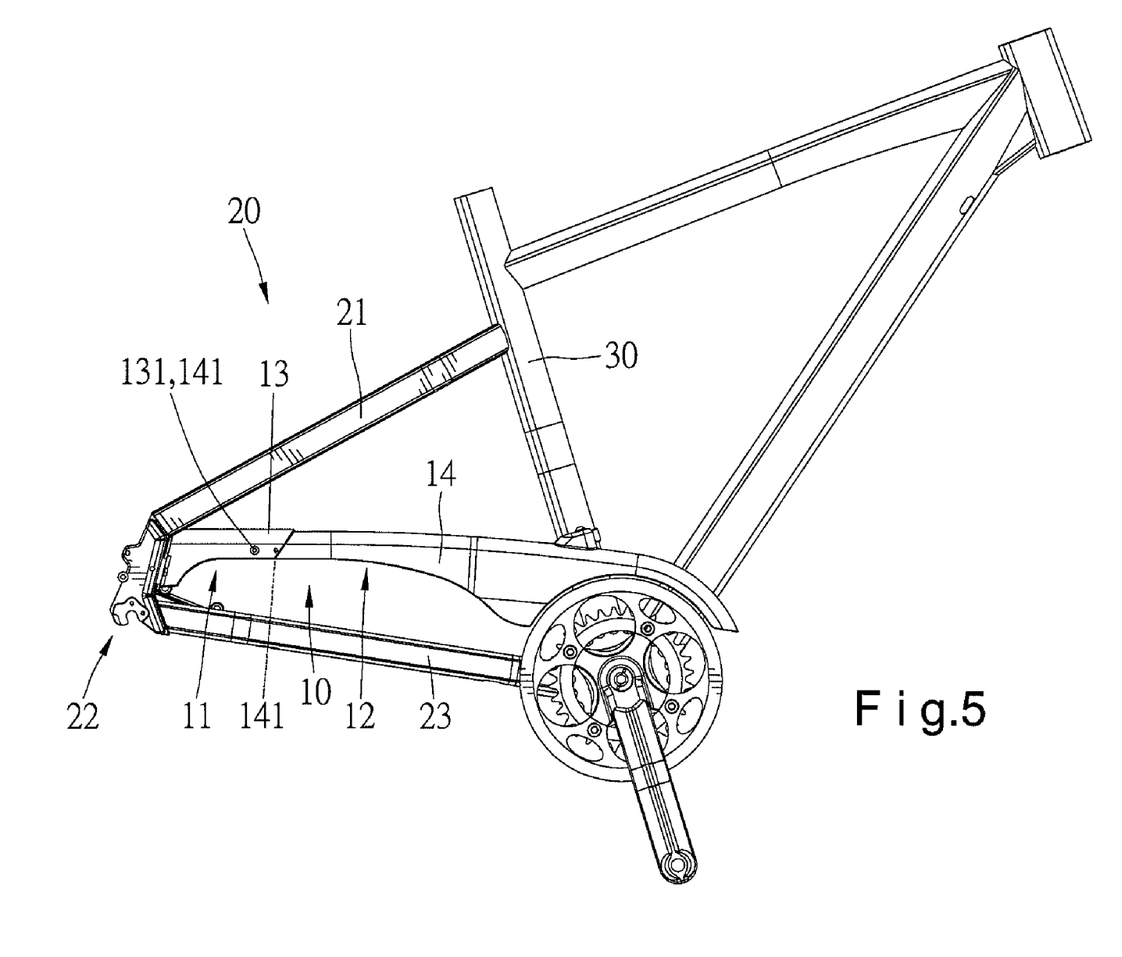
FIG. 5 is another side view of the chainguard and the bicycle frame, in which the bicycle frame has a different size and the bicycle chainguard is adjusted in longitudinal length to fit to the frame.

The rear section 13 is adjustably mounted to the front section 14 such that the housing has a variable overall length. Therefore, it is not problematic when the size of the bicycle frame is varied, as shown in FIG. 5. In this embodiment, the front section 14 has a plurality of location holes 141, the rear section 13 has a hole 131, and a connector 132 is inserted through the hole 131 and engagable in one of the plurality of the holes 141 to position the rear section 13 at one of the various positions with respect to the front section 14.

Figure 6:
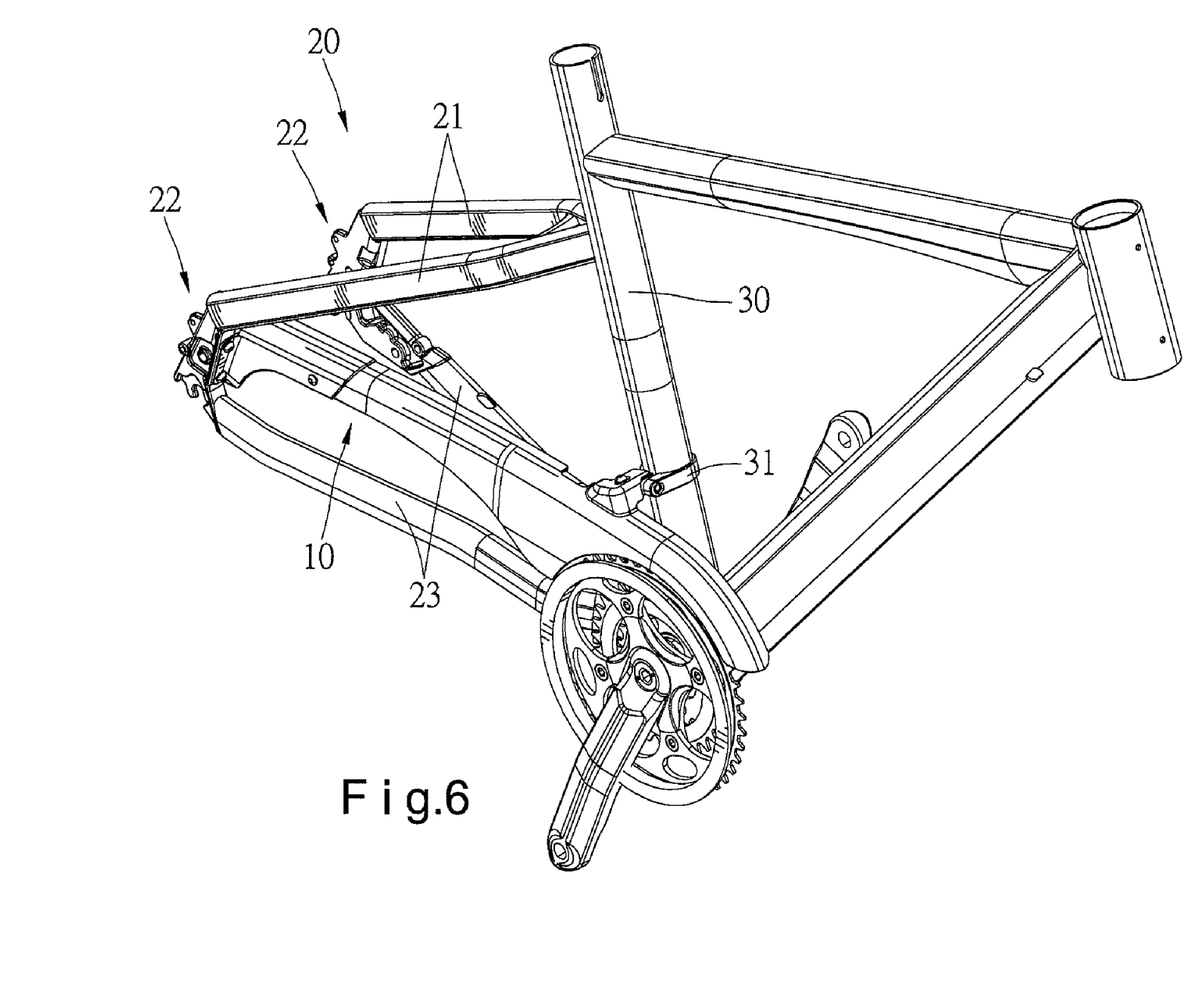
FIG. 6 is a perspective view of a chainguard and a bicycle frame in accordance with a second embodiment of the present invention.
Figure 7:
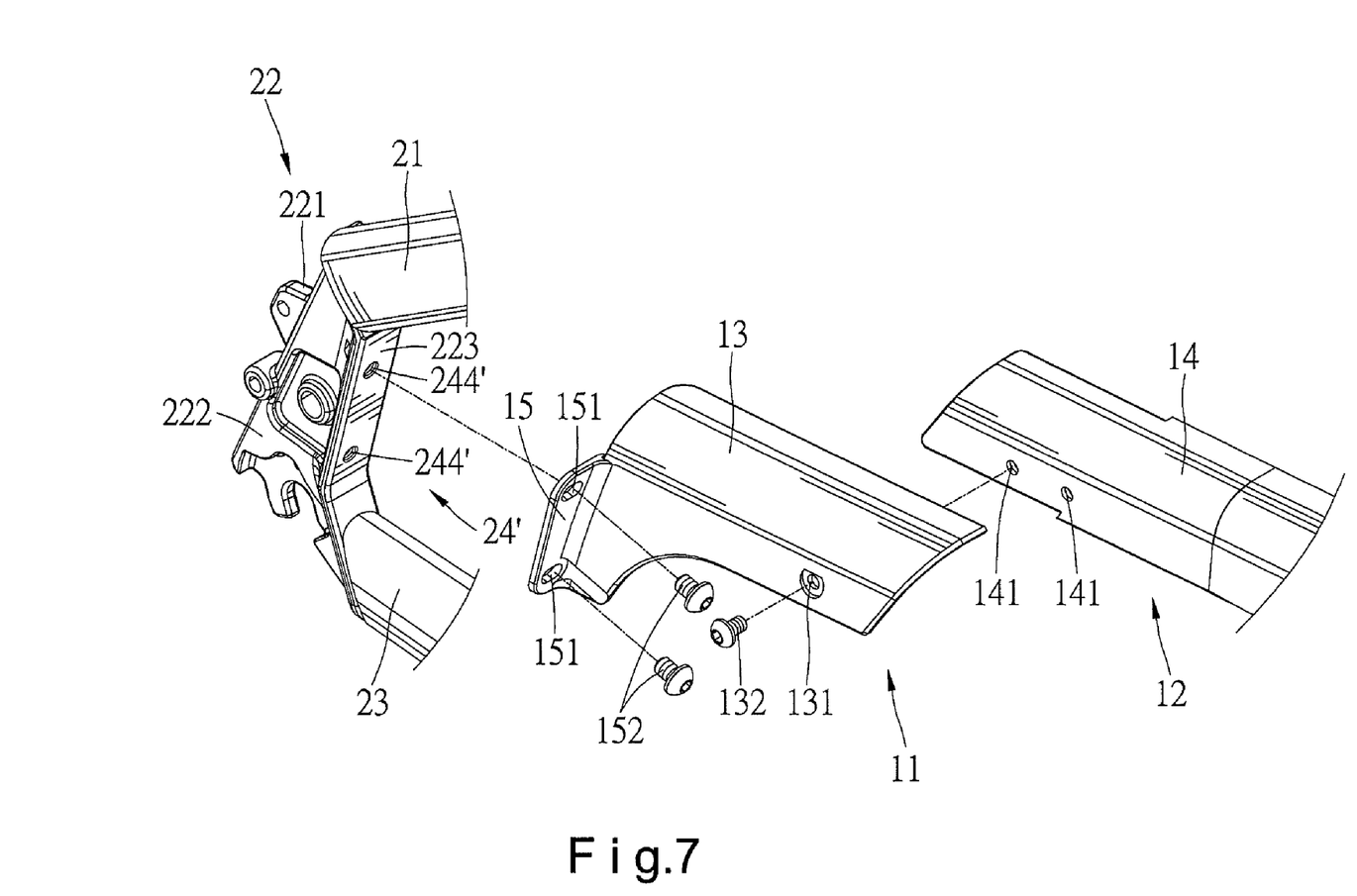
FIG. 7 is a partial, exploded perspective view of the chainguard and the bicycle frame in FIG. 6.

FIGS. 6 and 7 show an alternative bicycle frame embodying the present invention. The bicycle frame is similar to the first embodiment except that it includes a positioning portion 24' which is modified from the positioning portion 24 by eliminating the retaining portion 241. Additionally, the positioning portion 24' may include two holes 244'. Further, the engaging portion 15 in the chainguard 10 also utilizes two holes 151.

Figure 8:
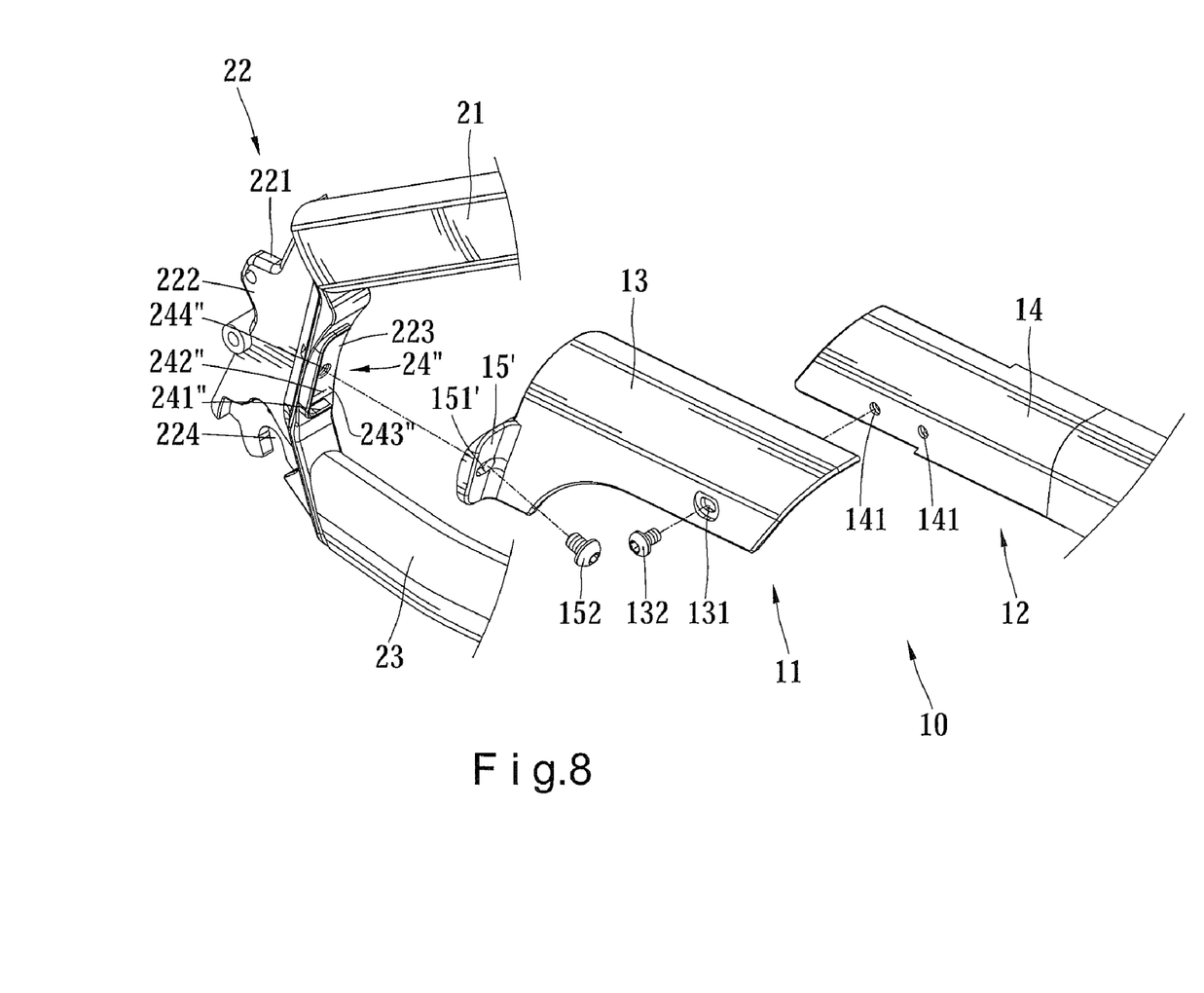
FIG. 8 is an exploded, perspective view of a chainguard and a bicycle frame in accordance with a third embodiment of the present invention.

FIG. 8 shows a positioning portion 24" which differentiate from the positioning portion 24 in that it is substantially concave. Like the positioning portion 24, the positioning portion 24" includes a retaining portion 241", space 242", an opening 243", and a hole 244". Likewise, it is not limiting that the positioning portion 24' is planar (as shown in FIG. 7). The positioning portion 24' can be substantially concave. As such, an engaging portion 15' received in the positioning portion 24" includes a convex side lying on the positioning portion 24". Like the engaging portion 15, the engaging portion 15' includes a hole 151' defined therein.

Figure 9:
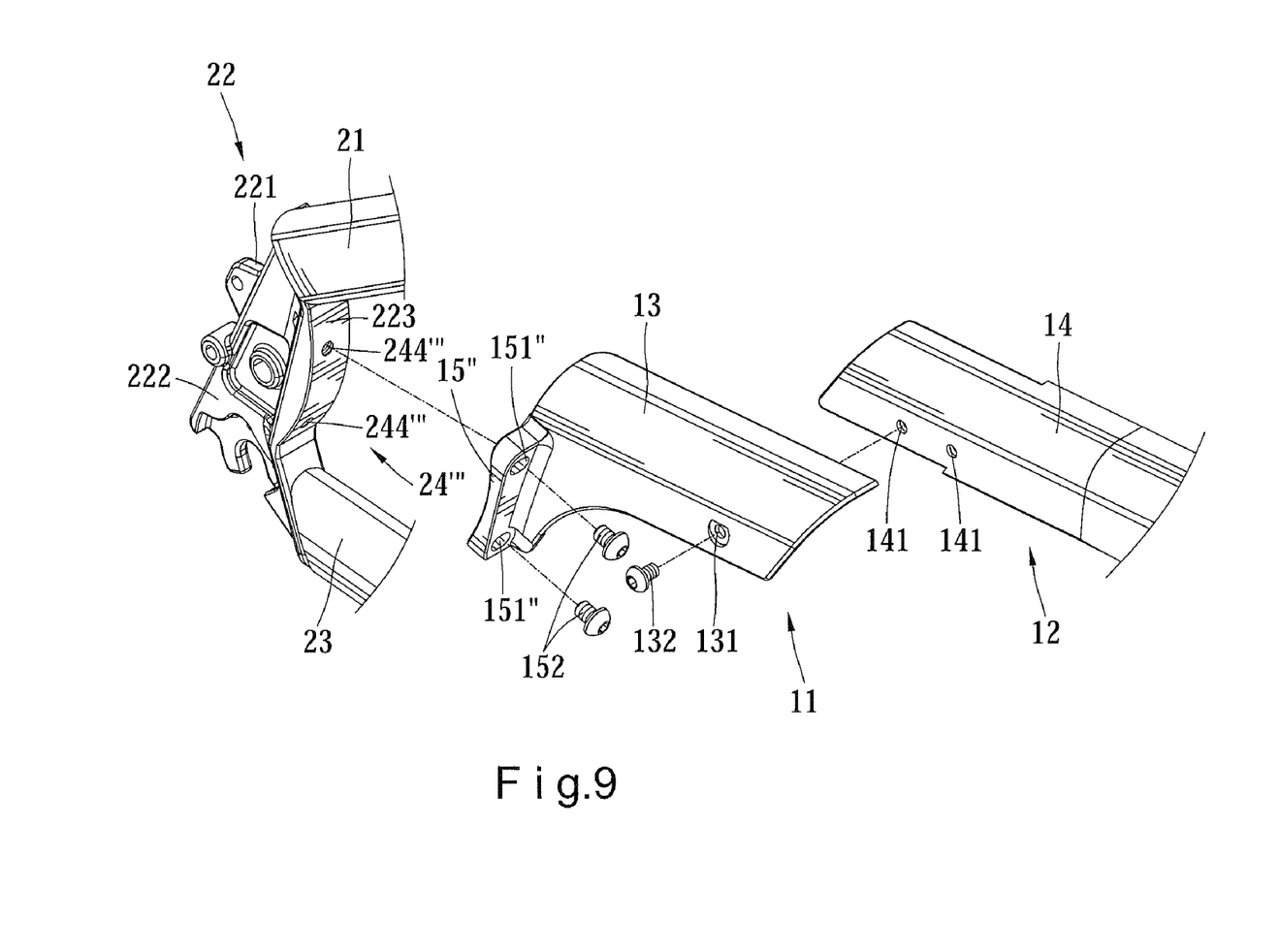
FIG. 9 is an exploded, perspective view of a chainguard and a bicycle frame in accordance with a fourth embodiment of the present invention.

FIG. 9 shows a positioning portion 24''' which differentiate from the positioning portion 24' in that it is substantially convex. Like the positioning portion 24', the positioning portion 24''' includes two holes 244''. As such, the engaging portion 15" received in the positioning portion 24''' includes a concave side lying on the positioning portion 24'''. Like the engaging portion 15, the engaging portion 15" includes a hole 151" defined therein. In this embodiment, the engaging portion 15" includes two holes 151" defined therein.

Based on the forgoing, it is therefore an aspect of the invention that the connecting portion 16 does not protrude outwardly from the outer surface of the housing and that the engaging portion 15 does not protrude beyond the second surface of the second portion 22 of the rear stay 20. So, the chainguard 10 would not have an adverse effect on flowing of the rider's pedaling action.

It is also an aspect of the invention that the first and second portions 21 and 22 are interconnected obliquely at a corner, which substantially defines an obtuse angle to facilitate the installation of the chainguard 10 to the bicycle frame.

While the specific embodiments have been illustrated and described, numerous modifications come to mind without significantly departing from the spirit of invention, and the scope of invention is only limited by the scope of accompanying claims.

What is claimed is:

1. A chainguard and a bicycle frame on which the chainguard is mounted comprising:
    a bicycle frame structure including a rear stay including a first portion and a second portion, with the second portion adapted for engaging with an axle of a rear wheel, with the first and second portions interconnected at a corner defining an obtuse angle and extended obliquely to each other, with the second portion including a first surface proximal to the rear wheel and a second surface opposed to the first surface and a third surface substantially transverse to and interconnecting the first and second surfaces, with the third surface defining a positioning portion; and
    a chainguard structure including a housing having a length, with the housing including an engaging portion extending substantially transversely to the length of the housing, and with the engaging portion mounted on the positioning portion; and
    means for securing the engaging portion on the positioning portion;
    wherein the positioning portion is substantially concave, and wherein the engaging portion includes a convex side lying on the positioning portion.

2. The chainguard and the bicycle frame as claimed in claim 1 wherein the positioning portion has a ridge in proximity to the second surface, and wherein the engaging portion is mounted within the ridge.

3. The chainguard and the bicycle frame as claimed in claim 2 wherein the positioning portion is substantially planar, and wherein the engaging portion includes a planar side lying on the positioning portion.

4. The chainguard and the bicycle frame as claimed in claim 1 wherein the positioning portion includes a retaining portion and a space delimited within the retaining portion, and wherein the retaining portion is in the form of a ridge.

5. The chainguard and the bicycle frame as claimed in claim 4 wherein the retaining portion includes a proximal end, a distal end and an opening spacing the proximal and distal ends.

6. The chainguard and the bicycle frame as claimed in claim 5 wherein the opening opens in a direction in order that the engaging portion is inserted outwardly with respect to the first surface.

7. The chainguard and the bicycle frame as claimed in claim 6 wherein the housing includes a front section and a rear section adjustably mounted to the front section such that the housing has a variable overall length.

8. A chainguard and a bicycle frame on which the chainguard is mounted comprising:
    a bicycle frame structure including a rear stay including a first portion and a second portion, with the second portion adapted for engaging with an axle of a rear wheel, with the first and second portions interconnected at a corner defining an obtuse angle and extended obliquely to each other, with the second portion including a first surface proximal to the rear wheel and a second surface opposed to the first surface and a third surface substantially transverse to and interconnecting the first and second surfaces, with the third surface defining a positioning portion; and
    a chainguard structure including a housing having a length, with the housing including an engaging portion extending substantially transversely to the length of the housing, and with the engaging portion mounted on the positioning portion; and
    means for securing the engaging portion on the positioning portion;
    wherein the positioning portion is substantially convex, and wherein the engaging portion includes a concave side lying on the positioning portion.

9. The chainguard and the bicycle frame as claimed in claim 8 wherein the positioning portion includes a retaining portion and a space delimited within the retaining portion, and wherein the retaining portion is in the form of a ridge.

10. The chainguard and the bicycle frame as claimed in claim 9 wherein the retaining portion includes a proximal end, a distal end and an opening spacing the proximal and distal ends.

11. The chainguard and the bicycle frame as claimed in claim 10 wherein the opening opens in a direction in order that the engaging portion is inserted outwardly with respect to the first surface.

12. The chainguard and the bicycle frame as claimed in claim 11 wherein the housing includes a front section and a rear section adjustably mounted to the front section such that the housing has a variable overall length.

13. A chainguard and a bicycle frame on which the chainguard is mounted comprising:

a bicycle frame structure including a rear stay including a first portion and a second portion, with the second portion adapted for engaging with an axle of a rear wheel, with the first and second portions interconnected at a corner defining an obtuse angle and extended obliquely to each other, with the second portion including a first surface proximal to the rear wheel and a second surface opposed to the first surface and a third surface substantially transverse to and interconnecting the first and second surfaces, with the third surface defining a positioning portion; and a chainguard structure including a housing having a length, with the housing including an engaging portion extending substantially transversely to the length of the housing, and with the engaging portion mounted on the positioning portion; and means for securing the engaging portion on the positioning portion;

wherein the positioning portion is substantially planar, wherein the engaging portion includes a planar side lying on the positioning portion, wherein the positioning portion includes a retaining portion and a space delimited within the retaining portion, and wherein the retaining portion is in the form of a ridge.

14. The chainguard and the bicycle frame as claimed in claim 13 wherein the retaining portion includes a proximal end, a distal end and an opening spacing the proximal and distal ends.

15. The chainguard and the bicycle frame as claimed in claim 14 wherein the opening opens in a direction in order that the engaging portion is inserted outwardly with respect to the first surface.

16. The chainguard and the bicycle frame as claimed in claim 15 wherein the housing includes a front section and a rear section adjustably mounted to the front section such that the housing has a variable overall length.

17. A chainguard and a bicycle frame on which the chainguard is mounted comprising:

a bicycle frame structure including a rear stay including a first portion and a second portion, with the second portion adapted for engaging with an axle of a rear wheel, with the first and second portions interconnected at a corner defining an obtuse angle and extended obliquely to each other, with the second portion including a first surface proximal to the rear wheel and a second surface opposed to the first surface and a third surface substantially transverse to and interconnecting the first and second surfaces, with the third surface defining a positioning portion; and a chainguard structure including a housing having a length, with the housing including an engaging portion extending substantially transversely to the length of the housing, and with the engaging portion mounted on the positioning portion; and means for securing the engaging portion on the positioning portion, wherein the housing includes a front section and a rear section adjustably mounted to the front section such that the housing has a variable overall length.

* * * * *